United States Patent

Witte et al.

[15] 3,687,889
[45] Aug. 29, 1972

[54] PROCESS FOR PREPARING OIL-EXTENDING RUBBER

[72] Inventors: Josef Witte, Cologne, Stammheim; Friedrich Haas, Cologne, Buchheim; Gunter Marwede, Leverkusen, all of Germany

[73] Assignee: Farbenfabriken Bayer Aktiengesellschaft, Leverkusen, Germany

[22] Filed: July 22, 1969

[21] Appl. No.: 843,807

[30] Foreign Application Priority Data

Aug. 6, 1968 Germany..........P 17 95 068.4

[52] U.S. Cl. ......260/30.6 R, 252/429 A, 260/30.8 R, 260/31.8 DR, 260/31.8 G, 260/31.8 H, 260/33.2 R, 260/33.4 R, 260/33.6 A, 260/33.6 AQ, 260/41.5 R, 260/94.3, 260/94.7 N
[51] Int. Cl...........................C08c 11/22, B01j 11/84
[58] Field of Search........260/94.3, 94.7 N, 33.6 AQ, 260/32.6 A, 30.8 R, 31.8 DR, 31.8 G, 31.8 H, 33.2 R, 33.4 R, 33.6 A; 252/429 A

[56] References Cited

UNITED STATES PATENTS

| | | |
|---|---|---|
| 3,165,503 | 1/1965 | Kahn et al. ...............260/94.3 |
| 3,424,736 | 1/1969 | Nudenberg et al. .......260/94.3 |
| 3,008,944 | 11/1961 | Wilson..................260/94.7 N |
| 3,135,725 | 6/1964 | Carlson et al.........260/94.7 N |
| 3,139,418 | 6/1964 | Marullo et al. ...........260/94.3 |
| 3,219,650 | 11/1965 | Hill..........................260/94.3 |
| 3,373,132 | 3/1968 | Sutter et al.........260/33.6 AQ |
| 3,386,983 | 6/1968 | Witte et al. ................260/94.3 |

Primary Examiner—Morris Liebman
Assistant Examiner—H. H. Fletcher
Attorney—Connolly and Hutz

[57] ABSTRACT

An oil-extended polyisoprene composition which comprises
a. 100 parts by weight of a synthetic cis-1,4-polyisoprene which has been prepared by polymerizing isoprene in solution in a hydrocarbon with an organometallic mixed catalyst of titanium tetrachloride, an aluminum trialkyl and/or an aluminum trialkyl etherate and stopping the polymer solution containing the mixed catalyst with an aliphatic or cycloaliphatic diamine or polyamine and an aliphatic or cycloaliphatic secondary amine containing at least 10 carbon atoms, optionally in admixture with a lower aliphatic alcohol, followed by stabilization with a conventional anti-ager, and
b. from 15 to 50 parts by weight of a rubber extending oil and a process for producing said mixture.

8 Claims, No Drawings

PROCESS FOR PREPARING OIL-EXTENDING RUBBER

Oil-extended rubbers based on natural rubber or cis-1,4-polyisoprene are of commercial and economic interest. Unfortunately, considerable difficulties are involved in the large-scale production of natural rubber-oil blends, as the vulcanisate properties of such blends are unsatisfactory. Tensile strength, modulus, elasticity and structural strength are all far from adequate. As with natural rubber-oil blends, the commercially available oil-extended synthetic cis-1,4-polyisoprenes of the lithium and titanium type yield vulcanisates with unsatisfactory properties.

This invention relates to mixtures of
a. 100 parts by weight of a synthetic cis-1,4-polyisoprene which has been prepared by polymerising isoprene in solution in a hydrocarbon with an organometallic mixed catalyst of
1. titanium tetrachloride and
2. an aluminum trialkyl and/or an aluminum trialkyl etherate, and stopping the polymer solution containing the mixed catalyst with an aliphatic or cycloaliphatic diamine or polyamine and an aliphatic or cycloaliphatic secondary amine containing at least 10 carbon atoms, optionally in admixture with a lower aliphatic alcohol, followed by stabilization with a conventional anti-ager, and
b. from 15 to 50 parts by weight of an aliphatic, naphthenic or aromatic rubber extending oil.

One object of the invention is a process for producing a cis-1,4-polyisoprene-rubber extending oil blend which comprises
a. Polymerising isoprene in solution in an inert aliphatic, cycloaliphatic or aromatic hydrocarbon solvent using an organometallic mixed catalyst based on titanium tetrachloride, an aluminum trialkyl and/or an aluminum trialkyl etherate.
b. inactivating said catalyst at the end of the polymerization by adding 0.05 to 0.5 percent by weight based on polyisoprene of an aliphatic or cycloaliphatic di- or polyamine and simultaneously or subsequently 0.1 to 1 percent by weight based on polyisoprene of a secondary aliphatic or cycloaliphatic monoamine containing at least 10 carbon atoms
c. incorporating from 15 to 50 parts by weight based on polyisoprene of a rubber extending oil.
d. recovering the polyisoprene-rubber extending oil blend from the obtained solution by removing the solvent.

In one embodiment a lower aliphatic alcohol may be added additionally in step (b).

The polymerization step (a) may be carried out in a conventional way by first providing the solvent (which is a hydrocarbon such as n-hexane, mixtures of alkane hydrocarbons, benzene, toluene or similar solvents) and introducing the catalyst components. Preferably the titanium tetrachloride and the trialkyl aluminum (alkyl meaning preferably alkyl having one to six carbon atoms) and/or aluminum trialkyl etherate (e.g., with dibutyl ether) are added simultaneously. The molar ratio of titanium to aluminum is preferably 1 : 1.5 to 1 : 0.7. The amount of ether, if any, should be sufficient to form the etherate. The catalyst solution thus produced is introduced into a solution of 8 to 20 percent of isoprene in the same solvent and polymerization is effected at temperatures of between 0° and 30°C. There is obtained a solution of cis-1,4-polyisoprene.

The inactivation step (b) may be carried out by adding the amines dissolved in an inert solvent, preferably the solvent used in the polymerization step. The concentration of the amine solution may be between 1 and 20 percent by weight. There are several modes of operation, e.g., a solution of the di- or polyamine may be added first, followed by an optional washing of the resulting solution with water (in order to remove water soluble catalyst residues) and the solution of the monoamine and the antiager may be added subsequently. Also one solution containing both amines may be added.

Diamines or polyamines (this term meaning preferably tri- and tetraamines) which may be used in this invention are e.g., aliphatic di- or polyamine containing saturated aliphatic hydrocarbon radicals with one to 10 carbon atoms or cycloaliphatic radicals having five to seven carbon atoms. Examples of these amines are 1,2-diamino ethane; 1,2-di(methylamino)-ethane; bis-(2-aminoethyl)-amine; 1,11-diamino-3,6,9triazodecane; 1,3-diamino propane; bis-(2-aminopropyl)-amine; 1,4-diamino butane; 1,6-diamino hexane; and 1,4-diamino cyclohexane.

Secondary monoamines are aliphatic or cycloaliphatic secondary amines containing a total of at least nine carbon atoms, preferably 9-25 carbon atoms. Examples of such amines are: di-2-ethylhexyl amine, dicyclohexyl amine and, preferably, N-methyl stearylamine, or other derivatives of methylamine with a linear or branched alkyl radical containing more than nine carbon atoms or mixtures thereof.

In some cases it may be of advantage to add a lower aliphatic alcohol such as methanol, ethanol or isopropanol to the amines in order to improve their solubility. The amount of this alcohol may e. g. be between 10 to 100 percent by weight based on the amines.

In step (c) the rubber extending oil is added. This adding is effected at temperatures of between 10° and 50°C. Care must be taken to effect a thorough mixing with the rubber solution.

Suitable rubber extending oils are the paraffinic, naphthenic or aromatic mineral oils, customarily used in the rubber industry or their intermediates, oils of vegetable origin such as linseed oil, synthetic hydrocarbons and other synthetic plasticizers. They may suitably be characterized by their viscosity-density constant (VDC), the following main distinctions being made:

| Viscosity density constant | Classification of mineral oils |
| --- | --- |
| 0.790–0.819 | paraffinic |
| 0.820–0.849 | relatively naphthenic |
| 0.850–0.899 | naphthenic |
| 0.900–0.949 | relatively aromatic |
| 0.950–0.999 | aromatic |
| 1.000–1.049 | highly aromatic |
| >1.050 | extremely aromatic |

Preferred rubber extending oils are

1. Mineral oil plasticisers
a. Predominantly paraffinic components : 55% by weight
Density $d_4^{15}$ (g/ml) : 0.85–0.95

| | |
|---|---|
| Refractive index ($n_D^{20}$) | : 1.465–1.490 |
| Aniline point (AP — °C.) | : 90–127 |
| Refraction intercept ($n_D$–0.5 $d_4^{20}$) | : <1.048 |
| Viscosity/density constant | |
| (D–0, 24–0, 022 log. ($V_2$–35.5))/0.755 | : 0.78–0.84 |
| b. With high naphthenic components | : 25% by weight of cycloaliphatics |
| Density $d_4^{15}$ (g/ml) | : 0.87–1.0 |
| Refractive index ($n_D^{20}$) | : 1.50–1.57 |
| Aniline point (AP — °C.) | : 30–90 |
| Refraction intercept ($n_D$–0.5 $d_4^{20}$) | : 1.042–1.060 |
| Viscosity/density constant | |
| (D–0.24–0.022 log.($V_2$–35.5))/0.755 | : 0.820–0.910 |
| c. With a large component of aromatic hydrocarbons | |
| Density $d_4^{15}$ (g/ml) | : >0.960 |
| Refractive index ($n_D^{20}$) | : 1.55–1.60 |
| Aniline point (AP — °C.) | : 5–35 |
| Refraction intercept ($n_D$–0.5 $d_4^{20}$) | : >1.055 |
| Viscosity-density constant | |
| (D–0.24–0.22 log. ($V_2$–35.5))/0.755 | : >0.901 |

2. Synthetic hydrocarbons:
a. Saturated hydrocarbons, for example polyisobutylenes or copolymers of isobutylene, 1-butene, or 2-butene having molecular weight of from 300 to 15,000.
b. Unsaturated hydrocarbons, for example polybutadiene, polyisoprene, and copolymers of butadiene and isoprene with olefins such as propylene, butylene and/or aromatic vinyl compounds such as styrene, or vinyl toluene having molecular weights of from 300–15,000.
3. Natural products such as:
Pine tar
Colophony
Cumarones
Linseed oil
4. Synthetic plasticizers such as:
Adipic acid esters
Azelaic acid esters
Phosphoric acid esters
Phthalic acid esters
Sebacic acid esters
Hydrocarbons of fairly high molecular weight
Ethers
Thioether esters For more detailed information see H.A. Munderloh, Kautschuk und Gummi, Vol. 12 (1959) No. 9, p. WT 246–256 and copending U.S. application Ser. No. 813,688, filed Apr. 4, 1969, and now abandoned.

The recovery step (d) uses the common methods for removing solvents from rubber solutions, e. g. the method of introducing the rubber solution into hot water or a steam destillation process. The oil extended crumbs retained in the recovery step may be dried in any conventional way, e. g. in a drying chamber on a belt drier or in a screw extruder.

The oil-extended rubber obtained by the process described above is distinguished by its outstanding properties. Both its vulcanization behavior characterized by favorable scorch-behavior and crosslinking yield, and also the properties of the vulcanisates such as their tensile strength, modulus, hardness (Shore A) resilience and tear resistance are distinctly superior to those of standard commercial oil-extended polyisoprene. There is a particular marked improvement in the reversion stability of the vulcanisates which can be observed in all ageing processes, for example in the high-temperature vulcanization of heavy-gauge rubber articles and in permanent dynamic stressing such as occurs for example in tires for heavy vehicles.

EXAMPLE 1

Preparation of the catalyst 68 ml of n-hexane are introduced under nitrogen into a dry vessel equipped with stirring mechanism. A solution of 1.252 g (66 mMols) of titanium tetrachloride in 134 ml of n-hexane and a solution of 0.678 g (59.4 mMols) of aluminum triethyl and 0.308 g (23.8 mMols) of di-n-butyl ether in 134 ml of n-hexane, are simultaneously added dropwise while stirring at a temperature of 0°C. The brown catalyst suspension formed is stirred for 30 minutes at 0°C.

b. polymerization 60 liters of dry hexane and 4,400 g of isoprene are introduced under nitrogen into a dry autoclave equipped with stirring mechanism. The contents of the autoclave are cooled to 8°C. under nitrogen. The catalyst suspension is added at that temperature. Polymerization beings immediately without any evidence of a latent period. The heat of polymerization is dissipated by external cooling in such a way that the polymerization temperature rises slowly to 12°C. over a period of 3 hours. By this time, a conversion rate of 97percent has been reached. The polymer has a Mooney Viscosity ML4'/100°C of 108.

c. Preparation of the oil-rubber and working-up

The polyisoprene solution prepared as described in (b) is divided in the absence of air and moisture.

Oil rubber A

One half of the polymer solution is admixed with a solution of 2.2 g of bis-(2-aminoethyl)-amine in 100 ml of benzene, and the resulting mixture is stirred for 15 minutes. A solution of 11 g of N-methyl stearylamine and 11 g of 2,6-di-tert.-butyl- 4methylphenol in 250 ml of hexane is then added with stirring. 600 g of a naphthenic extender oil [Ingraplast NS$^{(R)}$], are then added and thoroughly distributed by stirring.

The oil-rubber solution thus prepared is freed from the solvent by introduction into water at 92°C. The water-moist oil-rubber crumbs are dried for 48 hours at 50° C. in vacuo. Oil content: 28 pphr, ML-4'/100°C. = 48 ; Defo (80°C.) = 650/23.

Oil-rubber B, comparison test

The other half of the cis-1,4-polyisoprene solution prepared in accordance with (b) is stopped and stabilized with a solution of 11 g of 2,6-di-tert.-butyl-4-methyl phenol and 20 g of ethanol in 350 ml of hexane. 600 g of Ingraplast NS$^{(R)}$ are then added, and the mixture is stirred until it is completely homogeneous. Oil-rubber B is further processed in the same way as oil-rubber A. Oil content: 28 pphr Ml-4/100° C. = 46 Defo(80° C.) = 325/14

The oil-rubber blends prepared in accordance with example 1 were compared with one another, with a natural rubber-oil blend and with two commercial products (lithium type and titanium type), in a series of tests.

| Oil-rubber test formulation | Parts by weight |
|---|---|
| Rubber | 100.0$^{x)}$ |
| ZnO | 3.0 |
| Stearic acid | 2.0 |
| naphthenic extending oil | 25.0$^{xx)}$ |
| HAF-carbon black | 60.0 |
| Sulphur | 2.5 |
| 2-benzothiazyl-N-cyclohexyl-sulphenamide | 0.5 |
| ASM 4010 NA N-phenyl-N'-isopropyl-p-phenylene diamine | 1.0 |
| ASM PAN phenyl-α-naphthylamine | 1.0 | x)or corresponding quantities of oil-rubber
xx)and no oil.

Mixing order on the rollers (400 × 200 m/m) 40° C.

| | |
|---|---|
| Rubber | approx. 3 minutes rotation |
| ZnO | 4 minutes |
| ASM | 5 minutes |
| Carbon black + stearic acid | 17–18 minutes |
| Accelerator | 18 mintues |
| Sulphur | 20–21 minutes |
| Total mixing time | 22–23 minutes |
| 3 × narrow, 3 × overturn | |

TABLE 1

Vulcanisate data

| Product | Crude rubber ML-4' 100° | Crude rubber Defo H/E 80° | Mixture ML-4' 100° | Mixture Defo H/E | Vulc. 3 atms., mins. | Tensil strength, kp./c·m.² | Elongation at break, percent | M./kp./cm.²/H. 300% | M./kp./cm.²/H. 500% | Shore A 23° | Shore A 75° | E 23° | E 27° | Struct., kp./4 mm |
|---|---|---|---|---|---|---|---|---|---|---|---|---|---|---|
| According to Example 1/A | 48 | 600/23 | 37 | 500/9 | 10 | 146 | 555 | 65 | 131 | 51 | 48 | 36 | 44 | 26 |
| | | | | | 20 | 195 | 520 | 104 | 90 | 61 | 59 | 41 | 51 | 40 |
| | | | | | 30 | 192 | 490 | 110 | 198 | 62 | 61 | 41 | 50 | 38 |
| | | | | | 60 | 178 | 490 | 102 | 185 | 62 | 59 | 39 | 49 | 35 |
| | | | | | 90 | 175 | 500 | 98 | 178 | 60 | 58 | 39 | 47 | 32 |
| According to Example 1/B | 46 | 325/4 | 39 | 500/10 | 10 | 47 | 575 | 34 | 50 | 44 | 34 | 33 | 32 | 4 |
| | | | | | 20 | 178 | 490 | 91 | 177 | 58 | 56 | 39 | 45 | 29 |
| | | | | | 30 | 175 | 455 | 104 | | 59 | 58 | 39 | 45 | 28 |
| | | | | | 60 | 165 | 450 | 96 | | 58 | 56 | 39 | 44 | 20 |
| | | | | | 90 | 150 | 440 | 89 | | 57 | 56 | 38 | 43 | 14 |
| NK/RSS No. 1 plus 25 p.p.h.r. oil | | | 31 | 400/14 | 10 | 83 | 420 | 43 | | 45 | 36 | 32 | 38 | 6 |
| | | | | | 20 | 153 | 490 | 85 | 160 | 57 | 53 | 37 | 41 | 26 |
| | | | | | 30 | 157 | 460 | 94 | | 59 | 56 | 37 | 44 | 26 |
| | | | | | 60 | 133 | 430 | 83 | | 59 | 55 | 35 | 41 | 21 |
| | | | | | 90 | 118 | 405 | 79 | | 59 | 53 | 35 | 38 | 18 |
| Commerical product 25 p.p.h.r. oil, titanium type | 42 | 500/15 | 51 | 775/15 | 10 | 68 | 500 | 32 | 66 | 44 | 35 | 33 | 36 | 5 |
| | | | | | 20 | 153 | 505 | 75 | 150 | 56 | 54 | 39 | 47 | 27 |
| | | | | | 30 | 160 | 495 | 81 | 165 | 59 | 58 | 39 | 50 | 26 |
| | | | | | 60 | 120 | 405 | 83 | | 59 | 57 | 36 | 46 | 17 |
| | | | | | 90 | 125 | 430 | 80 | | 58 | 57 | 37 | 46 | 14 |
| Commerical product 25 p.p.h.r. oil, Li-type | 47 | 1,175/30 | 65 | 800/13 | 10 | 73 | 700 | 19 | 45 | 40 | 33 | 34 | 39 | 10 |
| | | | | | 20 | 148 | 620 | 52 | 112 | 52 | 51 | 40 | 51 | 28 |
| | | | | | 30 | 188 | 530 | 64 | 130 | 55 | 55 | 39 | 33 | 25 |
| | | | | | 60 | 125 | 500 | 58 | 125 | 55 | 55 | 38 | 49 | 21 |
| | | | | | 90 | 115 | 475 | 60 | 118 | 54 | 54 | 38 | 47 | 17 |

We claim:

1. A process for producing a cis-1,4-polyisoprene-rubber extending oil blend which comprises the steps of (a) polymerizing isoprene in solution in an inert aliphatic, cycloaliphatic or aromatic hydrocarbon solvent in the presence of an organo-metallic mixed catalyst consisting essentially of titanium tetrachloride and aluminum trialkyl or aluminum trialkyl etherate or a mixture of aluminum trialkyl and aluminum trialkyl etherate, (b) inactivating said catalyst at the end of polymerization by adding thereto 0.05 to 0.5 percent by weight, based on polyisoprene, of an aliphatic or cycloaliphatic di- or polyamine and 0.1 to 1 percent by weight, based on polyisoprene, of a secondary aliphatic or cycloaliphatic monoamine containing at least 10 carbon atoms, (c) incorporating from 15 to 50 parts by weight, based on 100 parts by weight of polyisoprene, of a rubber-extending oil and (d) recovering polyisoprene-rubber extending oil blend from the resulting solution by removing said solvent.

2. The process of claim 1 wherein said secondary aliphatic or cycloaliphatic monoamine containing at least 10 carbon atoms is added to said catalyst at the same time said aliphatic or cycloaliphatic di- or polyamine is added.

3. The process of claim 1 wherein said secondary aliphatic or cycloaliphatic monoamine containing at least 10 carbon atoms is added to said catalyst after the addition of said aliphatic or cycloaliphatic di- or polyamine.

4. The process of claim 1 wherein a lower aliphatic alcohol is added in step (b).

5. The process of claim 1 wherein the di- or polyamine is added to said catalyst as a solution in a hydrocarbon solvent, the resulting solution is washed with water and the secondary aliphatic or cycloaliphatic monoamine containing at least 10 carbon atoms is subsequently added as a solution in a hydrocarbon solvent.

6. The process of claim 1 wherein the aliphatic or cycloaliphatic di- or polyamine is 1,2-diamino ethane; 1,2-di(methylamino)-ethane; bis-(2-aminoethyl)-amine; 1,11-diamino-3,6,9-triazodecane; 1,3-diamino propane; bis-(2-aminopropyl)-amine; 1,4-diamino butane; 1,6-diamino hexane or 1,4-diamino cyclohexane.

7. The process of claim 1 wherein said secondary aliphatic or cycloaliphatic monoamine containing at least 10 carbon atoms is di-2-ethylhexylamine, dicyclohexylamine, N-methyl stearylamine, N-methyl alkylamine wherein said alkyl moiety contains at least 10 carbon atoms or a mixture thereof.

8. The process of claim 1 wherein the secondary aliphatic or cycloaliphatic monoamine containing at least 10 carbon atoms is N-methyl stearylamine.

* * * * *